(12) United States Patent
Gilbert

(10) Patent No.: US 10,705,731 B2
(45) Date of Patent: Jul. 7, 2020

(54) DEVICE OPERATIONAL CONTROL SYSTEMS AND METHODS

(71) Applicant: THE BOEING COMPANY, Chicago, IL (US)

(72) Inventor: Brian David Gilbert, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 173 days.

(21) Appl. No.: 15/679,667

(22) Filed: Aug. 17, 2017

(65) Prior Publication Data

US 2019/0056862 A1 Feb. 21, 2019

(51) Int. Cl.
| | | |
|---|---|---|
| *G06F 3/0488* | (2013.01) | |
| *G06F 3/041* | (2006.01) | |
| *G06F 3/01* | (2006.01) | |
| *G06F 1/16* | (2006.01) | |
| *G06F 3/0489* | (2013.01) | |

(52) U.S. Cl.
CPC ........ *G06F 3/04886* (2013.01); *G06F 1/1626* (2013.01); *G06F 1/1694* (2013.01); *G06F 3/01* (2013.01); *G06F 3/0416* (2013.01); *G06F 3/04895* (2013.01)

(58) Field of Classification Search
CPC ....... G06F 3/04866; G06F 3/01; G06F 3/0416
See application file for complete search history.

(56) References Cited

U.S. PATENT DOCUMENTS

| | | | | |
|---|---|---|---|---|
| 7,822,513 | B2 * | 10/2010 | Wulff | G01P 13/00 |
| | | | | 701/1 |
| 8,077,143 | B2 * | 12/2011 | Panabaker | G09G 5/14 |
| | | | | 345/156 |
| 9,352,848 | B2 | 5/2016 | Nikolic | |
| 9,870,093 | B2 * | 1/2018 | Gannon | G06F 3/0418 |
| 9,942,715 | B2 * | 4/2018 | Racha | H04M 1/72577 |
| 2010/0216509 | A1 * | 8/2010 | Riemer | H04M 1/72577 |
| | | | | 455/557 |
| 2012/0011666 | A1 | 1/2012 | Fritsch | |
| 2013/0033418 | A1 * | 2/2013 | Bevilacqua | G06F 3/017 |
| | | | | 345/156 |
| 2013/0033433 | A1 * | 2/2013 | Rogers | G06F 3/04886 |
| | | | | 345/173 |
| 2013/0226452 | A1 * | 8/2013 | Watts | G01C 21/3407 |
| | | | | 701/528 |
| 2014/0181722 | A1 * | 6/2014 | Kim | G06F 3/0233 |
| | | | | 715/773 |

(Continued)

OTHER PUBLICATIONS

U.S. Appl. No. 15/635,292, filed Jun. 28, 2017.

*Primary Examiner* — Ricardo Osorio
(74) *Attorney, Agent, or Firm* — The Small Patent Law Group LLC; Joseph M. Butscher

(57) ABSTRACT

A device operational control system is configured to control operation of a device. The device operational control system includes a motion sensor that is configured to detect motion. The motion sensor is configured to output a motion signal indicative of the motion. An operational control unit is communicatively coupled to the motion sensor. The operational control unit is configured to receive the motion signal from the motion sensor and control at least one operational aspect of the device based on the motion.

21 Claims, 4 Drawing Sheets

(56) References Cited

U.S. PATENT DOCUMENTS

| | | | |
|---|---|---|---|
| 2014/0228077 A1* | 8/2014 | Xu | G06F 1/1626 |
| | | | 455/566 |
| 2014/0274216 A1* | 9/2014 | Olodort | H04M 1/006 |
| | | | 455/566 |
| 2016/0014039 A1 | 1/2016 | Reddy et al. | |
| 2016/0032446 A1 | 2/2016 | Gomi et al. | |
| 2016/0036996 A1* | 2/2016 | Midholt | G06F 1/3206 |
| | | | 455/567 |
| 2016/0055752 A1* | 2/2016 | McCann | G08G 5/0039 |
| | | | 701/533 |
| 2016/0144949 A1* | 5/2016 | Kestler | B64D 33/02 |
| | | | 244/53 B |
| 2017/0064157 A1* | 3/2017 | Lawrence | H04N 5/225 |
| 2017/0075442 A1 | 3/2017 | Thomas | |
| 2017/0228095 A1* | 8/2017 | Domaradzki | G06F 3/014 |
| 2017/0313248 A1* | 11/2017 | Kothari | B60K 35/00 |
| 2018/0068332 A1* | 3/2018 | Kajak | B64D 11/0015 |
| 2018/0132123 A1* | 5/2018 | Song | H04W 24/10 |
| 2018/0247542 A1* | 8/2018 | Koduru | G01C 23/00 |
| 2019/0147755 A1* | 5/2019 | Hampel | G08G 5/0091 |
| | | | 701/14 |

* cited by examiner

DEVICE OPERATIONAL CONTROL SYSTEMS AND METHODS

FIELD OF THE DISCLOSURE

Embodiments of the present disclosure generally relate to systems and methods for controlling devices, and more particularly to systems and methods for altering operational control of devices based on detected motion.

BACKGROUND OF THE DISCLOSURE

Various devices include operational controls. For example, a handheld cellular phone may include one or more physical operating members, such as buttons, a keyboard, and the like, and/or a touchscreen interface having one or more virtual operating members that allow an individual to control operation of the handheld device through interaction with the touchscreen. As another example, control systems within an aircraft may include touchscreen interfaces. Indeed, various vehicles include interior cabins having touchscreens that are configured to be used by individuals. For example, passengers onboard an aircraft may interact with touchscreens mounted to seats that allow the passengers to select entertainment options, request service from flight attendants, and/or the like. As another example, pilots within a cockpit of the aircraft may interact with one or more touchscreens that are used to control various operational aspects of the aircraft.

During a flight, an aircraft may experience turbulence. The turbulence may cause the fuselage and therefore the interior cabin of the aircraft to move. An individual attempting to engage the touchscreen (such as a virtual button shown on the touchscreen) may find it difficult to engage during periods of turbulence. For example, as the aircraft experiences turbulence, a hand of an individual may move (for example, bounce) in response thereto, and may not contact a desired area of the touchscreen. The turbulence may even cause an individual to inadvertently select an undesired input. That is, during periods of turbulence, an individual may attempt to touch a particular area of the touchscreen, but inadvertently contact a different area of the touchscreen, which may cause an undesired operational selection.

SUMMARY OF THE DISCLOSURE

A need exists for a system and method of ensuring desired operational selections in relation to a device during periods of turbulence, or other such motion. Further, a need exists for a system and method of preventing undesired operation of a device, such as during periods of turbulence.

With those needs in mind, certain embodiments of the present disclosure provide a device operational control system that is configured to control operation of a device. The device operational control system includes a motion sensor that is configured to detect motion. The motion sensor is configured to output a motion signal indicative of the motion. An operational control unit is communicatively coupled to the motion sensor. The operational control unit is configured to receive the motion signal from the motion sensor and control at least one operational aspect of the device based on the motion.

In at least one embodiment, the motion sensor is configured to detect the motion of the device. In at least one other embodiment, the motion sensor is configured to detect the motion of a structure in which the device is located.

The operational control unit is configured to switch the device from a normal operating state to an altered operating state in response to the motion exceeding a motion threshold. In at least one embodiment, the altered operating state disables a touchscreen of the device. In at least one other embodiment, the altered operating state disables at least one physical operating member of the device. In yet another embodiment, the altered operating state increases an engagement time or engagement pressure of one or both of a virtual operating member or a physical operating member of the device. In at least one embodiment, the altered operating state provides a confirmation engagement of a virtual operating member and/or a physical operating member of the device.

A display of the device may be configured to show a message during the altered operating state. The message indicates that the device is in the altered operating state.

In at least one embodiment, the device includes the device operational control system. In at least one other embodiment, the device is separate and distinct from the device operational control system.

Certain embodiments of the present disclosure provide a device operational control system method that is configured to control operation of a device. The device operational control method includes detecting motion with a motion sensor, outputting a motion signal indicative of the motion by the motion sensor, communicatively coupling an operational control unit to the motion sensor, receiving the motion signal that is output by the motion sensor by the operational control unit, and controlling (by the operational control unit) at least one operational aspect of the device based on the motion.

Certain embodiments of the present disclosure provide a vehicle that includes an interior cabin, a device within the interior cabin, and a device operational control system that is configured to control at least one operational aspect of the device.

DETAILED DESCRIPTION OF THE DISCLOSURE

Figure 1:
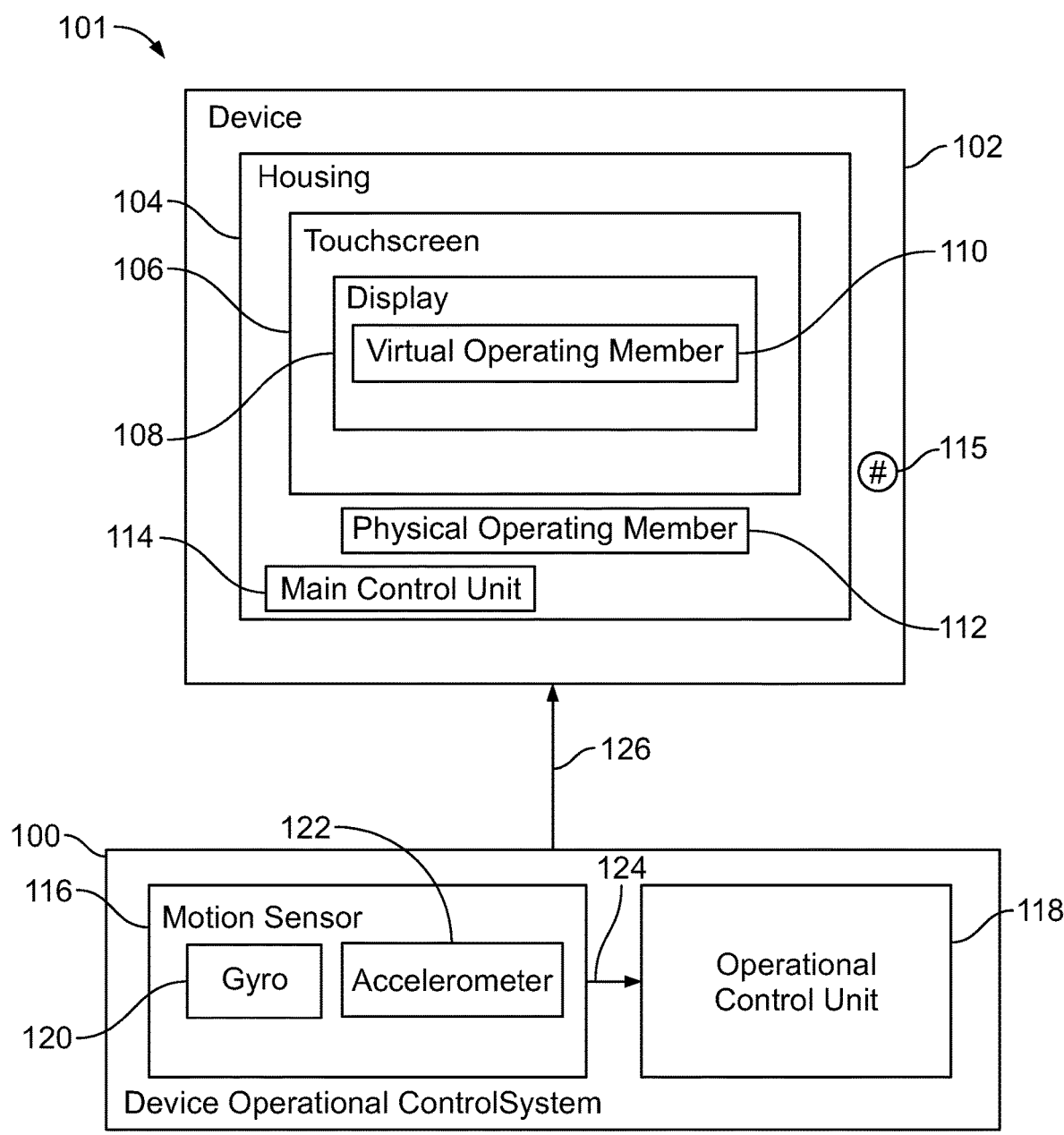
FIG. 1 illustrates a schematic block diagram of a device operational control system operatively coupled to a device, according to an exemplary embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide device operational control systems and methods that are configured to prevent or otherwise reduce undesired operation of a device. The device operational control systems and methods include a motion sensor that is configured to detect motion of the device (for example, motion experienced by the device). The motion sensor is communicatively coupled to an operational control unit. The motion sensor outputs a motion signal that is received by the operational control unit. Based on the motion signal received from the motion sensor, the operational control unit may alter operational control of the device. For example, in response to the motion exceeding a predetermined threshold, the operational control unit alters operational control of the device.

In at least one embodiment, the operational control unit alters operational control of the device by disabling touchscreen operation of the device. In at least one other embodiment, the operational control unit alters operational control of the device by providing an additional confirmation step for an input selection on a touchscreen. In at least one other embodiment, the operational control unit alters operational control of the device by requiring an increased time or pressure for a touch selection on the touchscreen. In at least one embodiment, the operational control unit alters operational control of the device by altering (for example, disabling) physical control members (such as keyboards, joysticks, physical buttons, and/or the like) of the device.

In at least one embodiment, the motion sensor is configured to detect air turbulence in relation to an aircraft, such as by calculating an eddy dissipation rate, and/or acceleration values in multiple axes, to determine whether touch screen inputs should be enabled or disabled, or whether touch input sensitivity should be dynamically adjusted. In this manner, flight deck control devices may be safeguarded from inadvertent activations or selections during periods of turbulence.

Certain embodiments of the present disclosure provide a device operational control system that is configured to automatically make an objective determination based on motion measurements (for example, turbulence measurements) to decide whether touch screen inputs are operational. The turbulence may be measured using eddy dissipation rate, and/or acceleration values in multiple axes via accelerometers. For example, a motion sensor may be or include an inertial measurement unit (IMU) that includes an accelerometer(s) and/or a gyroscope(s) in relation to roll, pitch, and yaw axes to determine longitudinal, lateral, and normal accelerations in relation to the device (such as within an aircraft). The aircraft may include one or more IMUs, and one or more flight control computers that are in communication with the IMU(s). A device within the aircraft, such as a display system computer, is configured to determine whether turbulence, intentional maneuvers, or other such motion is causing conditions that may make use of a touch screen difficult. If the detected motion exceeds a predetermined motion threshold (such as a predetermined amount of turbulence, g force, and/or the like), the operational control unit outputs an operational altering signal that is configured to alter operation of the touchscreen interface, for example.

In at least one embodiment, when operation of the touch screen is altered (such as temporarily disabled), a message is shown indicating as much. Alternate interaction or interactive devices (that is, operating members) may be used to interact with the displays while touch screens are disabled. Allowing the system to determine touch screen status eliminates subjective pilot judgment, and reduces the number of inadvertent actions during turbulence.

Touch screen displays in a flight deck send touch input data (for example, touch point state and X/Y positions for each touch point) to a cockpit display system (CDS) graphics server. The CDS processes inputs received from devices used to interact with the flight displays, which in addition to the touch inputs may include physical operating members such as a trackpad, trackball, joystick, mouse, rotary knobs, scroll wheels, arrow keys, and the like. The CDS arbitrates actions from input devices and sends display interaction event data to the application(s) driving the display graphics. For example, if a flight management system includes a button on a display format, the CDS sends an event that this button was pressed via one of the interaction or interactive devices. The Inertial Measurement Unit (IMU) uses accelerometer and gyroscope measurements in the roll, pitch, and yaw axes to determine longitudinal, lateral, and normal accelerations of the aircraft, respectively. The display system computer may use the aircraft longitudinal, lateral, and normal acceleration data to determine if aircraft movement, due to turbulence or even intentional maneuvers, is causing conditions that may make use of a touchscreen difficult. The display system computer may send a signal to the CDS to either ignore or process inputs from the touch screen.

FIG. 1 illustrates a schematic block diagram of a device operational control system 100 operatively coupled to a device 102, according to an exemplary embodiment of the present disclosure. The device operational control system 100 and the device 102 provide a system 101. The device operational control system 100 is configured to manage operational control of the device 102. In particular, the device operational control system 100 is configured to manage operational control of the device 102 based on detected motion of the device 102 and/or a structure (such as a vehicle) in which the device 102 is located. For example, the device operational control system 100 alters an operational state of the device 102 in response to detected motion (such as turbulence) experienced by an aircraft that exceeds a predetermined threshold. The device operational control system alters the operational state of the device 102 by one or more of disabling touchscreen operation of the device 102, requiring an additional confirmation engagement (for example, a pressing or other such touching of a virtual operating member or a physical operating member) for a touchscreen command, requiring additional engagement time and/or engagement pressure for a touchscreen command, disabling and/or altering operation of physical operating members of the device, and/or the like.

The device 102 may be a handheld device (for example, a cellular phone, a smart phone, an electronic tablet), a personal or laptop computer, a video game device, one or more control systems of a vehicle, and/or the like. The device operational control system 100 may be separate and distinct from the device 102, and may be communicatively coupled to the device 102 through one or more wired or wireless connections. Optionally, the device operational control system 100 may be part of the device 102. For example, the device operational control system 100 may be contained within a housing 104 of the device 102.

The device 102 includes the housing 104. In at least one embodiment, the housing 104 includes a touchscreen 106 having a display 108 that allows for electronic touchscreen operation of at least one aspect of the device 102. The display 108 (such as a screen, monitor, or the like) is configured to show visual images, such as graphics, video, and/or the like. In at least one embodiment, the display 108 is part of the touchscreen 106 that allows an individual to select various options and interact via one or more virtual operating members 110. The display 108 shows at least one virtual operating member 110 that allows for electronic touchscreen operation. For example, the virtual operating member 110 may be an image of a button, dial, slider, keyboard, switch, and/or the like that is electronically shown on the display 108.

The device 102 may also include one or more physical operating members 112 that are separate and distinct from the touchscreen 106. Examples of the physical operating member(s) 112 include a keyboard, a keypad, one or more buttons, one or more sliders, one or more trackballs, a joystick, a rotary dial or knob, a mouse, arrow keys, and the like. The physical operating member 112 provides a physical structure that is configured to control at least one aspect of the device 102 and is separate from the touchscreen 106.

The device 102 also includes a main control unit 114 within the housing 104. The main control unit 114 is communicatively coupled to the touchscreen 106 and the physical operating member 112, such as through one or more wired or wireless connections. The main control unit 114 is configured to control the device 102. For example, the main control unit 114 is configured to control the touchscreen 106, and receive command inputs from the virtual operating member 110 and the physical operating member 112 to control the device 102.

Alternatively, the device 102 may not include the touchscreen 106. In this embodiment, the device 102 includes the physical operating member(s) 112. As another alternative, the device 102 may not include the physical operating member 112, but does include the touchscreen 106.

The device operational control system 100 includes a motion sensor 116 that is communicatively coupled to an operational control unit 118 through one or more wired or wireless connections. The motion sensor 116 is configured to detect motion, such as that of the device 102 or another structure (such as the fuselage of an aircraft) in which the device 102 is located. For example, the device 102 may be onboard an aircraft (such as aircraft 200 described below), and the motion sensor 116 is configured to detect air turbulence that is experienced by the aircraft, and therefore the motion of the device 102 that occurs as a result of the turbulence onboard the aircraft. The motion sensor 116 is or includes at least one component that is configured to detect motion. In at least one embodiment, the motion sensor 116 includes one or more gyroscopes 120 and/or accelerometers 122, optical sensors (for example video or still motion cameras, ultrasonic sensors, and/or the like) that are configured to detect motion. In at least one embodiment, the motion sensor 116 includes a three-axis accelerometer and at least two gyros, such as mechanical or laser gyros. In at least one embodiment, the motion sensor 116 is an inertial measurement unit that is configured to detect air turbulence.

In at least one embodiment, the sensor 116 is configured to detect atmospheric conditions surrounding the device 102 and/or a structure in which the device 102 is present. The detected atmospheric conditions may then be analyzed to determine turbulence exposure to the device 102 and/or the structure caused by the detected atmospheric conditions. For example, eddy dissipation rate may be determined based on detection of energy dissipation in the atmosphere, such as by detecting heat due to molecular vibrations that occur as atmospheric energy cascades from higher to lower energy. Eddy dissipation rate quantifies the strength of the turbulence by the rate at which the turbulence dissipates. As such, the sensor 116 may be configured to detect eddy dissipation rate, which may then be analyzed to determine an impact of turbulence on an aircraft, for example, and/or a device within the aircraft. Therefore, the motion of the device 102 and/or the structure may be determined. Accordingly, in this embodiment, the sensor 116 indirectly determines motion of the device 102 and/or the structure, and, as such, is considered a motion sensor.

The motion sensor 116 detects motion and outputs a motion signal 124 that is indicative of the detected motion. The motion signal 124 is received by the operational control unit 118. The operational control unit 118 analyzes the motion signal 124 in relation to one or more stored motion thresholds. The motion threshold(s) is a predetermined value. For example, the motion threshold may be a predetermined magnitude of air turbulence at which touchscreen operation may be difficult.

In operation, the motion sensor 116 outputs the motion signal 124 to the operational control unit 118, which analyzes the motion signal 124 to determine whether the magnitude of motion as indicated by the motion signal 124 exceeds the motion threshold. If the motion indicated by the motion signal 124 does not exceed the motion threshold, the operational control unit 118 allows the device 102 to be operated according to a normal operating state. If, however, the operational control unit 118 determines that the motion signal 124 exceeds the motion threshold, the operational control unit 118 outputs an operational altering signal 126 that is configured to alter operational control of the device 102. In at least one embodiment, the normal operating state is a state in which the touchscreen 106 and components thereof function as designed by a manufacturer, and/or when touch interactions are being used to control the device 102.

In at least one embodiment, the operational altering signal 126 output by the operational control unit 118 alters the operational control of the device 102 by temporarily disabling the touchscreen 106. In this embodiment, the touchscreen 106 is disabled (that is, the virtual operating member 110 is disabled) as long as the detected amount of motion exceeds the motion threshold. When the touchscreen 106 is disabled, input commands for the device 102 may be made only through the physical operating member 112. In at least one other embodiment, the operational altering signal 126 disables both the touchscreen 106 and the physical operating member 112. In at least one embodiment, an altered state of one or more components of the device 102 (such as the touchscreen 106 and/or the physical operating member 112) may be canceled via an override feature, which may be on the device, and/or remotely located therefrom (such as within a cockpit of an aircraft).

After the detected amount of motion falls below the motion threshold, the operational control unit 118 updates the operational altering signal 126 (or no longer outputs the operational altering signal 126) so that the touchscreen 106 is again operational. That is, after the detected amount of motion falls below the motion threshold, the device 102 returns to a normal operating state that is unaltered by the operational control unit 118. In at least one embodiment, in response to the operational control unit 118 outputting the operational altering signal 126, the device 102 may remain in an altered operating state for a predetermined minimum amount of time, such as 2, 3, 4, or more minutes. The device 102 may remain in the altered operating state for a time that relates to the criticality of a particular function, for example. For example, a navigation system may remain in an altered operating state for 2-4 seconds, while a movie viewer on a seatback within an internal cabin of an aircraft may remain in an altered operating state for 2-4 minutes. In at least one other embodiment, after the device 102 is switched by the operational control unit 118 into the altered operating state, the device 102 may only be returned to the normal operating state through a manual control operation, such as a sequence of commands input by an individual through the physical operating member 112, for example.

In at least one embodiment, the operational control unit 118 may output the operational altering signal 126 that switches the device from a normal operating state to an altered operating state in which the physical operating member 112 is disabled, for example. For example, the device 102 may not include the touchscreen 106.

As described, based on the amount of motion detected by the motion sensor 116, the operational control unit 118 is configured to switch the device 102 from a normal operating state to an altered operating state, in which one or both the touchscreen 106 and the physical operating member 112 may be disabled. In at least one other embodiment, the altered operating state may not disable the touchscreen and/or the physical operating member 112. Instead, the altered operating state may include an additional confirmation step. For example, in the altered operating state, for each command input by an individual via the virtual operating member(s) 110 and/or the physical operating member 112, the operational altering signal 126 may cause the main control unit 114 (and/or the operational control unit 118) to prompt a user to input a confirmation command, such as through the virtual operating member 110 and/or the physical operating member 112. For example, upon a detected command input via the virtual operating member 110 and/or the physical operating member 112, the main control unit 114 and/or the operational control unit 118 may cause the display 108 to show a message requesting a follow-up command to be input to confirm the initial detected command. A follow-up command may be an additional press of the virtual operating member 110 and/or the physical operating member 112, for example.

In at least one other embodiment, the altered operating state may require a longer and/or increased pressure engagement of the virtual operating member 110 and/or the physical operating member 112 instead of completely disabling the touchscreen 106 and/or the physical operating member 112. For example, during the altered operating state, the operational control unit 118 and/or the main control unit 114 may recognize a detected command from the virtual operating member 110 and/or the physical operating member 112 after an increased time of engagement (such as 2 seconds or longer), and/or with increased finger pressure (such as an amount of finger pressure that is greater than recognized during normal operation) in relation to the virtual operating member 110.

When the operational control unit 118 switches the device 102 from the normal operating state to the altered operating state via the output operational altering signal 126, the main control unit 114 and/or the operational control unit 118 may cause the display 108 to output a message indicating that the device 102 is in the altered operating state. For example, the message may be a graphic, video, or text message shown on the display 108 indicating that the device 102 is in the altered operating state. As another example, the message may be broadcast as an audio signal output by a speaker 115 of the device 102.

The device operational control system 100 is configured to control operation of the device 102. As shown in FIG. 1, the device operational control system 100 includes the motion sensor 116, which is configured to detect motion (such as that of the device 102 or a structure in which the device 102 is located). The motion sensor 116 is configured to output the motion signal 124 indicative of the detected motion. The operational control unit 118 is communicatively coupled to the motion sensor 116, and is configured to receive the motion signal 124 from the motion sensor 116 and control at least one operational aspect (for example, how an individual inputs commands, such as through the touchscreen 106 and/or the physical operating member 112) of the device 102 based on the motion.

As shown, the operational control unit 118 and the main control unit 114 may be separate and distinct control units. In at least one embodiment, the operational control unit 118 and the main control unit 114 may be part of a single processing system of the device 102. For example, the operational control unit 118 and the main control unit 114 may be part of a single integrated circuit housed within the device 102.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the main control unit 114 and the operational control unit 118 may be or include one or more processors that are configured to control operation of the device 102, as described herein.

The main control unit 114 and the operational control unit 118 are configured to execute a set of instructions that are stored in one or more data storage units or elements (such as one or more memories), in order to process data. For example, the main control unit 114 and the operational control unit 118 may include or be coupled to one or more memories. The data storage units may also store data or other information as desired or needed. The data storage units may be in the form of an information source or a physical memory element within a processing machine.

The set of instructions may include various commands that instruct the main control unit 114 and the operational control unit 118 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the main control unit 114 and the operational control unit 118. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the main control unit 114 and the operational control unit 118 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
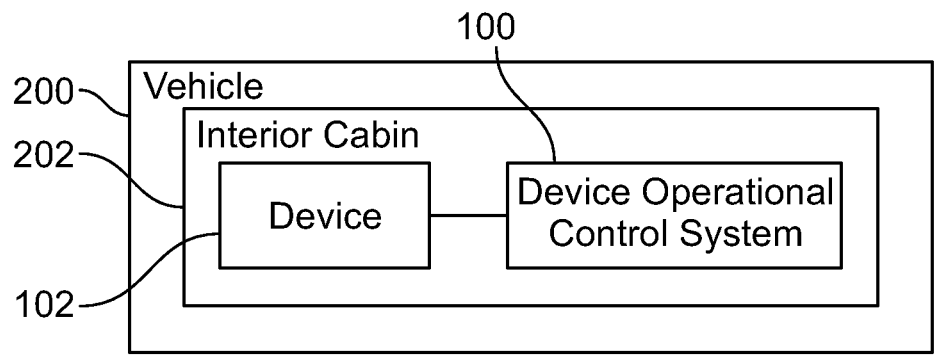
FIG. 2 illustrates a schematic block diagram of a vehicle having an interior cabin that includes at least one device coupled to a device operational control system, according to an exemplary embodiment of the present disclosure.

FIG. 2 illustrates a schematic block diagram of a vehicle 200 having an interior cabin 202 that includes at least one device 102 coupled to a device operational control system 100, according to an exemplary embodiment of the present disclosure. The device 102 and the device operational control system 100 are described with respect to FIG. 1. The vehicle 200 may be an aircraft, land-based vehicle, sea-based vehicle, or space-based vehicle including the interior cabin 202, which may include a cockpit and/or a passenger seating area. The device 102 may be a computer system that is configured to control operational aspects of the vehicle 200. For example, the device 102 may be a flight control computer, a display system computer, a personal entertainment system, and/or the like.

Figure 3A:
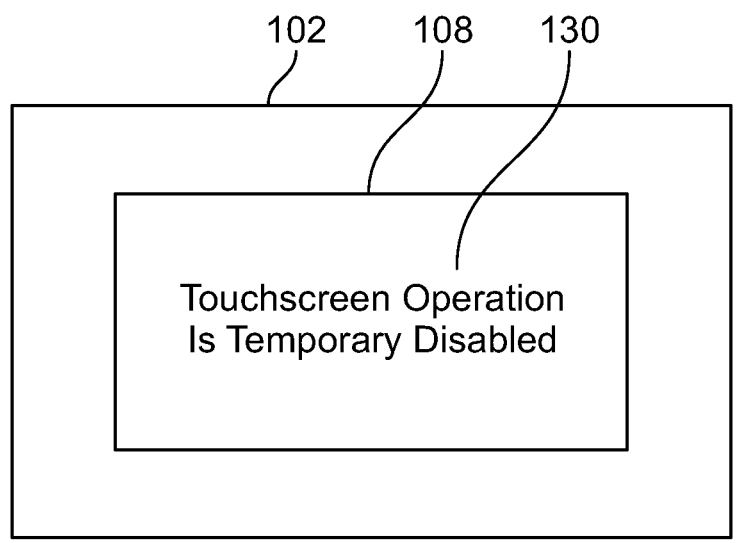
FIG. 3A illustrates a front view of a display of a device, according to an embodiment of the present disclosure.

FIG. 3A illustrates a front view of the display 108 of the device 102, according to an embodiment of the present disclosure. Referring to FIGS. 1 and 3, when the operational control unit 118 switches the device 102 into an altered operating state, the display 108 may show a message 130 indicating that the device 102 is in the altered operating state. For example, the message 130 may indicate that "Touchscreen Operation is Temporarily Disabled," as shown in FIG. 3A. The message 130 may optionally provide various other visual indications, such as one or more text, graphic, symbolic, video, and/or the like indications that the device 102 is in the altered operating state. As another example, the device 102 may output an audio signal indicating that the device 102 is in the altered operating state.

Figure 3B:
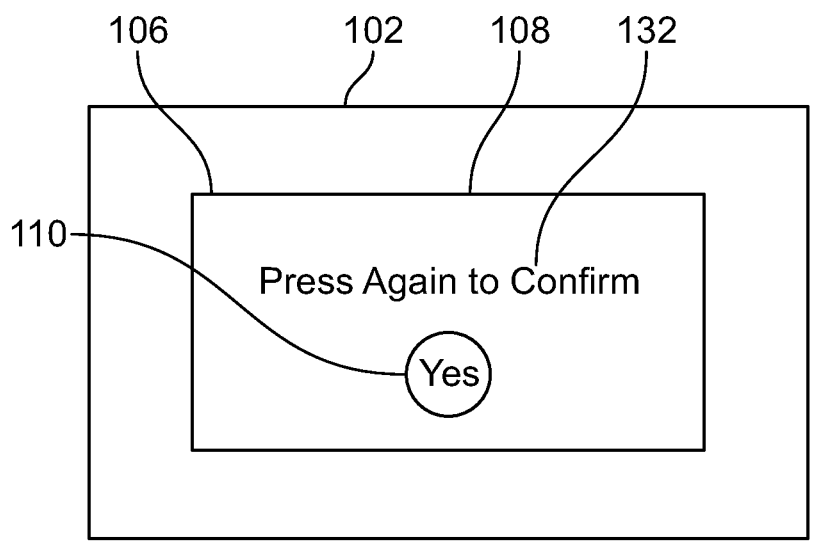
FIG. 3B illustrates a front view of a display of a device, according to an embodiment of the present disclosure.

FIG. 3B illustrates a front view of the display 108 of the device 102, according to an embodiment of the present disclosure. In this embodiment, in the altered operating state, the touchscreen 106 may not be disabled. Instead, in the altered operating state, the operational control unit 118 and/or the main control unit 114 (shown in FIG. 1) may require a confirmation of a command input. The display 108 may show a confirmation message 132 (such as "Press Again to Confirm") indicating that the virtual operating member 110 is to be pressed again in order for the command to be approved.

Figure 4:
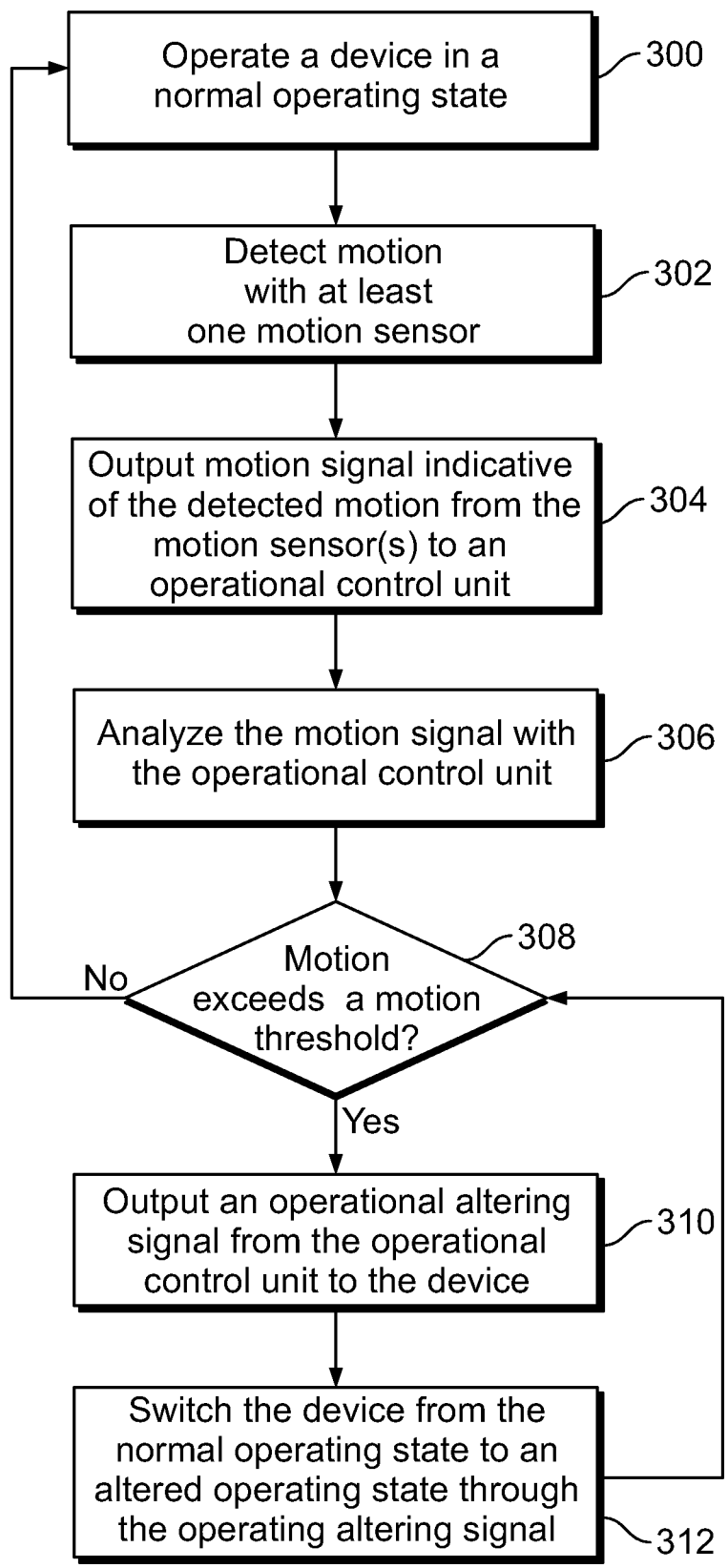
FIG. 4 illustrates a flow chart of a method of operating a device, according to an embodiment of the present disclosure.

FIG. 4 illustrates a flow chart of a method of operating a device, according to an embodiment of the present disclosure. Referring to FIGS. 1 and 4, the method begins at 300, at which the device 102 is operated in a normal operating state. At 302, the motion sensor 116 is used to detect motion (such as that experienced the device 102 or a structure in which the device 102 is located). At 304, the motion sensor 116 outputs a motion signal indicative of the detected motion to the operational control unit 118. At 306, the operational control unit 118 analyzes the motion signal.

At 308, the operational control unit 118 determines whether the motion as indicated by the motion signal exceeds the motion threshold, which may be a predetermined value stored within a memory of the operational control unit 118. If the motion does not exceed the motion threshold, the method returns to 300, at which the device 102 continues to be operated in the normal operating state.

If, however, the operational control unit 118 determines that the detected motion does exceed the motion threshold at 308, the method proceeds to 310, at which the operational control unit 118 outputs the operational altering signal 126 to the device 102. At 312, the operational altering signal 126 switches the device 102 from the normal operating state to the altered operating state. The method then returns to 308.

Figure 5:
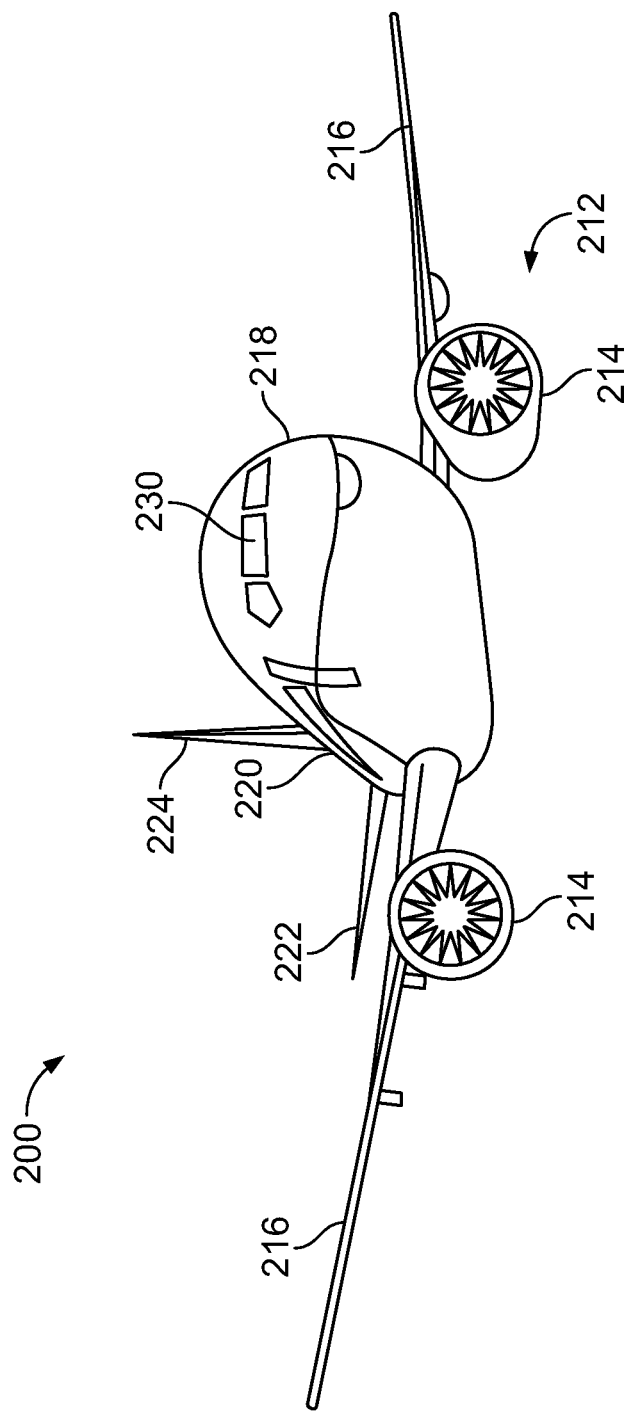
FIG. 5 illustrates a front perspective view of a vehicle, according to an exemplary embodiment of the present disclosure.

FIG. 5 illustrates a front perspective view of the vehicle 200, such as an aircraft, according to an exemplary embodiment of the present disclosure. The aircraft 200 includes a propulsion system 212 that may include two turbofan engines 214, for example. Optionally, the propulsion system 212 may include more engines 214 than shown. The engines 214 are carried by wings 216 of the aircraft 200. In other embodiments, the engines 214 may be carried by a fuselage 218 and/or an empennage 220. The empennage 220 may also support horizontal stabilizers 222 and a vertical stabilizer 224. The fuselage 218 of the aircraft 200 defines an interior cabin, which includes a cockpit and passenger area.

Alternatively, instead of an aircraft, embodiments of the present disclosure may be used with various other vehicles, such as automobiles, buses, locomotives and train cars, seacraft, spacecraft, and the like.

As described herein, embodiments of the present disclosure provide systems and methods of ensuring desired operational selections in relation to a device during periods of turbulence, or other such motion. Further, embodiments of the present disclosure provide systems and methods of preventing undesired operation of a device.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A device operational control system that is configured to control operation of a device within an aircraft, the device operational control system comprising:
    at least one motion sensor that is configured to detect air turbulence outside of the aircraft, wherein the at least one motion sensor is configured to output a motion signal indicative of the air turbulence; and
    an operational control unit communicatively coupled to the at least one motion sensor, wherein the operational control unit is configured to receive the motion signal from the at least one motion sensor and control at least one operational aspect of the device based on the air turbulence,
    wherein the operational control unit is configured to switch the device from a normal operating state to an altered operating state in response to the air turbulence exceeding a motion threshold, and
    wherein the altered operating state increases physical engagement time and physical engagement pressure of one or both of a virtual operating member and a physical operating member of the device.

2. The device operational control system of claim 1, wherein the at least one motion sensor is further configured to detect motion of the device.

3. The device operational control system of claim 1, wherein the at least one motion sensor is further configured to detect motion of a structure in which the device is located.

4. The device operational control system of claim 1, wherein the altered operating state disables a touchscreen of the device.

5. The device operational control system of claim 1, wherein the altered operating state disables at least one physical operating member of the device.

6. The device operational control system of claim 1, wherein the altered operating state provides a confirmation engagement of one or both of the virtual operating member or the physical operating member of the device.

7. The device operational control system of claim 1, wherein a display of the device is configured to show a message during the altered operating state, wherein the message indicates that the device is in the altered operating state.

8. The device operational control system of claim 1, wherein the device includes at least a portion of the device operational control system.

9. The device operational control system of claim 1, wherein the device is separate and distinct from the device operational control system.

10. The device operational control system of claim 1, wherein the motion sensor detects the air turbulence by calculating an eddy dissipation rate.

11. The device operational control system of claim 1, wherein the at least one motion sensor is configured to directly detect the air turbulence outside of the aircraft.

12. A device operational control system method is configured to control operation of a device, the device operational control method comprising:
    detecting motion with a motion sensor;
    outputting a motion signal indicative of the motion by the motion sensor;
    communicatively coupling an operational control unit to the motion sensor;
    receiving the motion signal that is output by the motion sensor by the operational control unit; and
    controlling, by the operational control unit, at least one operational aspect of the device based on the motion,
    wherein the controlling comprises switching the device from a normal operating state to an altered operating state in response to the motion exceeding a motion threshold,
    wherein the altered operating state increases a physical engagement time and physical engagement pressure of one or both of a virtual operating member or a physical operating member of the device.

13. The device operational control method of claim 12, wherein the detecting comprises one or both of the motion of the device or the motion of a structure in which the device is located.

14. The device operational method of claim 12, wherein the altered operating state further disables a touchscreen of the device.

15. The device operational control method of claim 12, wherein the altered operating state further disables at least one physical operating member of the device.

16. The device operational control method of claim 12, wherein the altered operating state provides a confirmation engagement of one or both of the virtual operating member or the physical operating member of the device.

17. The device operational control method of claim 12, further comprising showing a message during the altered operating state on a display of the device, wherein the message indicates that the device is in the altered operating state.

18. The method of claim 12, wherein the motion is caused by air turbulence.

19. A vehicle comprising:
an interior cabin;
a device within the interior cabin, wherein the device comprises a display; and
a device operational control system comprising:
 a motion sensor that is configured to detect motion of one or both of the device or the vehicle, wherein the motion sensor is configured to output a motion signal indicative of the motion; and
 an operational control unit communicatively coupled to the motion sensor, wherein the operational control unit is configured to receive the motion signal from the motion sensor and control at least one operational aspect of the device based on the motion,
 wherein the operational control unit is configured to switch the device from a normal operating state to an altered operating state in response to the motion exceeding a motion threshold,
 wherein the display of the device is configured to show a message during the altered operating state, wherein the message indicates that the device is in the altered operating state, and
 wherein the altered operating state disables one or both of a touchscreen or at least one physical operating member of the device, and increases a physical engagement time and physical engagement pressure of one or both of a virtual operating member and the at least one physical operating member of the device.

20. The vehicle of claim 19, wherein the altered operating state further provides a confirmation engagement of one or both of the virtual operating member or the physical operating member of the device.

21. The vehicle of claim 19, wherein the motion is caused by air turbulence.

* * * * *